United States Patent [19]
O'Dea et al.
[11] 3,822,366
[45] July 2, 1974

[54] ONE CHANNEL CARRIER INTERCOM SYSTEM

[75] Inventors: Orrin B. O'Dea, Garden Grove; Luis Albert Arce, Lakewood, both of Calif.

[73] Assignees: Jim C. Garrett, Long Beach; Robert H. Johnson, Marina Del Rey; Jack Shelton, Long Beach, all of, Calif. ; part interest to each

[22] Filed: Oct. 10, 1972

[21] Appl. No.: 296,225

[52] U.S. Cl..... 179/2.5 R, 179/175.25, 179/175.3 A
[51] Int. Cl. .............................................. H04j 1/18
[58] Field of Search........ 179/2.5 R, 15 FD, 175.25, 179/175.3 A

[56] References Cited

UNITED STATES PATENTS

| | | | |
|---|---|---|---|
| 2,337,878 | 12/1943 | Espenschied | 179/15 FD |
| 3,288,945 | 11/1966 | McNair | 179/175.3 |
| 3,375,334 | 3/1968 | Robinson | 179/175.3 |
| 3,510,584 | 5/1970 | Krasin | 179/2.5 R |
| 3,627,933 | 12/1971 | Garrett | 179/175.2 R |

OTHER PUBLICATIONS

Transmission Systems for Communications, Bell Telephone Laboratories, Copyright 1959, pp. 5–13 to 5–17.

Telephony; "Improved Pair Identification Cuts Cable Handling Costs," Connally et al., Aug. 9, 1971; pp. 68–72.

*Primary Examiner*—Kathleen H. Claffy
*Assistant Examiner*—David L. Stewart
*Attorney, Agent, or Firm*—Albert L. Gabriel

[57] ABSTRACT

A telephone communication device includes a pair of portable units connectable by a pair of wires. A Master Unit has means for generating a 100 KHz carrier frequncy while the Slave Unit has a carrier frequency amplifier and limiter for providing the same instantaneous carrier frequency for the Slave as is being generated by the Master. Modulator/Demodulator means are provided in each unit for transmitting and receiving a voice frequency and a tone generator signal for verification and path determination without disturbing subscriber conversation.

12 Claims, 4 Drawing Figures

ONE CHANNEL CARRIER INTERCOM SYSTEM

BACKGROUND OF THE INVENTION

The instant invention relates to a portable communication device for use by telephone installation and maintenance personnel to converse with each other over non-loaded cable pairs and to verify point-to-point wiring.

In central telephone offices and switching equipment centers point-to-point cabling determines the calling path from the calling party to the called party. Therefore, if an error exists in this path, the calls encountering this wiring error will in most cases be misdirected and end up at "wrong numbers." Therefore, at the time of installation of the wiring it is essential that the correct paths be established. However, this installation normally interfaces with equipment in service, wherein calls are already in progress making it extremely difficult to verify the connection at that time. It has thus been customary to perform the verification process during the early morning hours so that there will be less chance of interference with subscriber usage. Also, since the line must be monitored for possible conversation, secrecy of the conversation is not always maintained with the prior art devices.

In telephone carrier systems, in order to transmit and receive over the same pair of wires using what are known as balanced lattice modulator and demodulator circuits, the sending and receiving channels for each message terminal have been brought together by means of hybrid coils. In other words, a hybrid coil has been placed between the modulator and demodulator at each end. The transmitter and receiver units have been of different carrier frequencies, thus necessitating the use of filters to separate them and requiring extremely stable methods of generating the exact carrier frequencies at each message terminal to reproduce the intelligence transmitted by each unit.

It is also possible to establish a two-way telephone circuit over a single carrier channel by inserting another hybrid coil between the terminal apparatus and the carrier line. This method is rarely used because of its inherent balance and cross-talk difficulties, together with problems encountered in generating a precise frequency at each end to reproduce intelligence. Both of these methods are not satisfactory because of cross-talk, inherent balance, etc. Therefore, present carrier systems are normally operated on an effective four-wire basis with separate carrier channels for transmissions in the two directions for each message terminal.

In devices now being employed it is normally necessary for oscillators to be positioned at each end of the line and a separate modulator and demodulator to be used for inserting and detecting signal formation. Often, more than two conductors are required to accomplish the end-to-end path. In the prior art when less than four wires are used, the transmitting and receiving functions are on separate carrier frequencies, thus two oscillators are required at each end and synchronization becomes a problem.

SUMMARY

It is an object of the instant invention to provide a device which will cause no interference with normal activities occurring on the cable pair. That is, there will be no interference with dialing, conversation or data being transmitted.

Another object of the invention is to provide a device for checking the continuity of lines while the subscribers are using them without disturbing the conversation.

A further object is to provide telephone maintenance and installation personnel immediate access to a cable pair for the purpose of verifying the wiring without monitoring a subscriber's conversation.

Still another object is to provide a "trace-tone" which can be applied to a cable pair for purposes of verification, allowing a single maintenance man to perform the required test if necessary.

Another object of the invention is to provide novel end-to-end communication device having simultaneous talk and monitor capability over an established pair of lines at a carrier frequency which will not interfere with normal telephone processes taking place over the wires.

An object of the invention is to provide a device which will accomplish modulation and demodulation in both terminals utilizing a single oscillator, i.e., one modulator circuit is used for modulation and demodulation simultaneously. In this manner synchronization from end-to-end is not important. The elimination of the usual second oscillator is accomplished by sending a carrier simplex with a reference to the common power supply ground over a pair of wires to be verified. The detected simplex frequency is amplified and fixed at a constant amplitude, thus eliminating the second oscillator due to the presence of the original 100 KHz which will always be synchronized with the original signal.

Another object is the use of an amplifier with instantaneous limiting characteristics to insert the constant carrier level to the modulator/demodulator at the slave terminal. The system will function without adjustment for up to 30db of line loss. In essence, the amplifier performs the functions of an oscillator in the slave terminal.

It is an object of the instant invention to use one carrier channel for both message terminals, only one circuit to provide the modulation and demodulation and only one hybrid coil for each message terminal.

Still another object is the ability to change a carrier channel or carrier frequency to a different frequency slot in one simple step without affecting the other message terminal, thereby eliminating the lengthy process of realigning each carrier channel every time a change in frequency is made.

The system includes a Master Unit and a Slave Unit connectable together over a pair of wires. Both Master and Slave Units include a pair of input/output terminals connected to a High Pass Filter which in turn is connected to a Lattice Modulator/Demodulator. The Modulator/Demodulator is connected through a 3 db Impedance Matching Pad to a 4/2 Wire Hybrid Conversion Circuit. The output of the hybrid circuit passes through an amplifier to a receiver. A voice input and a tone generator is fed into the hybrid circuit. The Master Unit includes a 100KHz Carrier Frequency Oscillator while the Slave Unit has a Carrier Frequency Amplifier and Limiter to provide the same instantaneous frequency in both units while only using a single oscillator.

BRIEF DESCRIPTION OF THE DRAWINGS

The foregoing and other objects, features and advantages of the invention will become more apparent from the following detailed description and accompanying drawings, wherein.

DETAILED DESCRIPTION OF THE INVENTION

General

Figure 1:
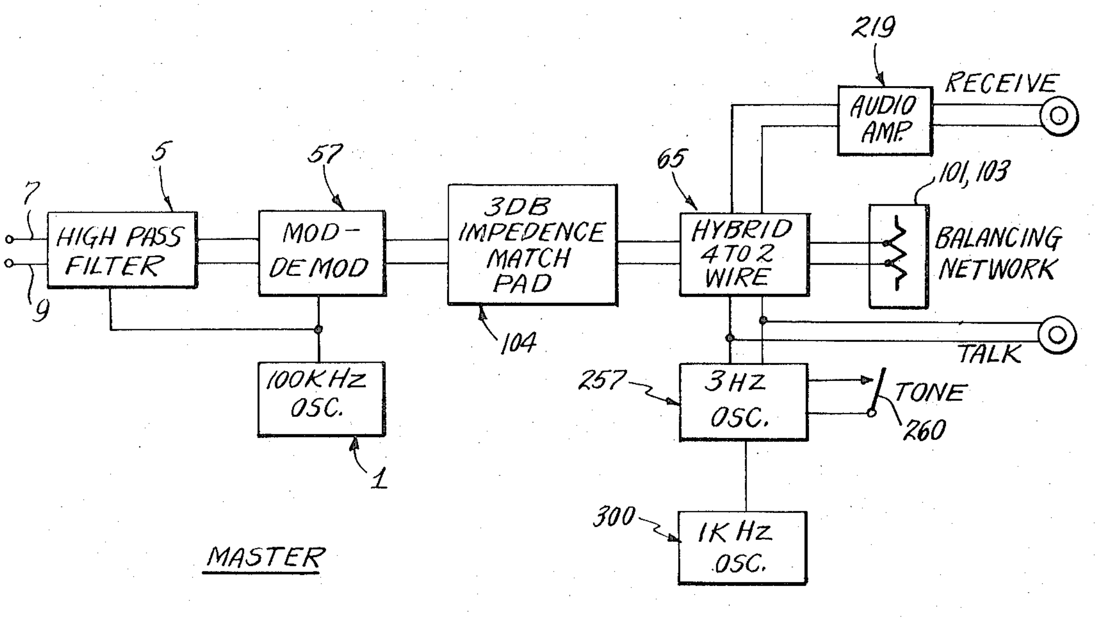
FIG. 1 is a schematic diagram in block form of the Master circuit according to the instant invention.
Figure 2:
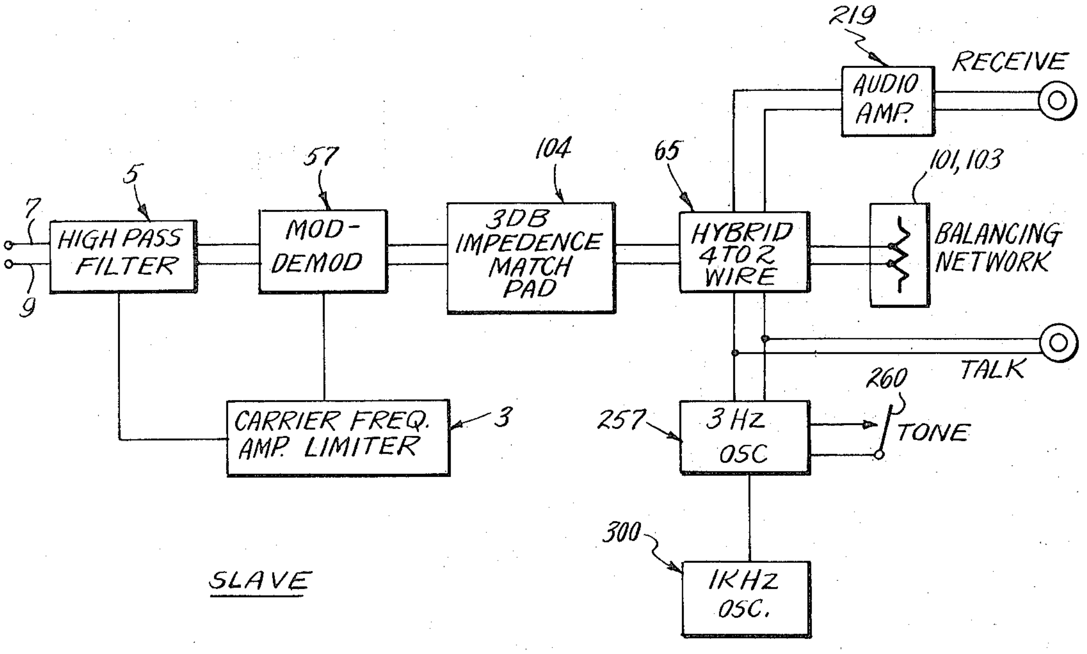
FIG. 2 is a schematic diagram in block form of the Slave circuit according to the instant invention.
Figure 3:
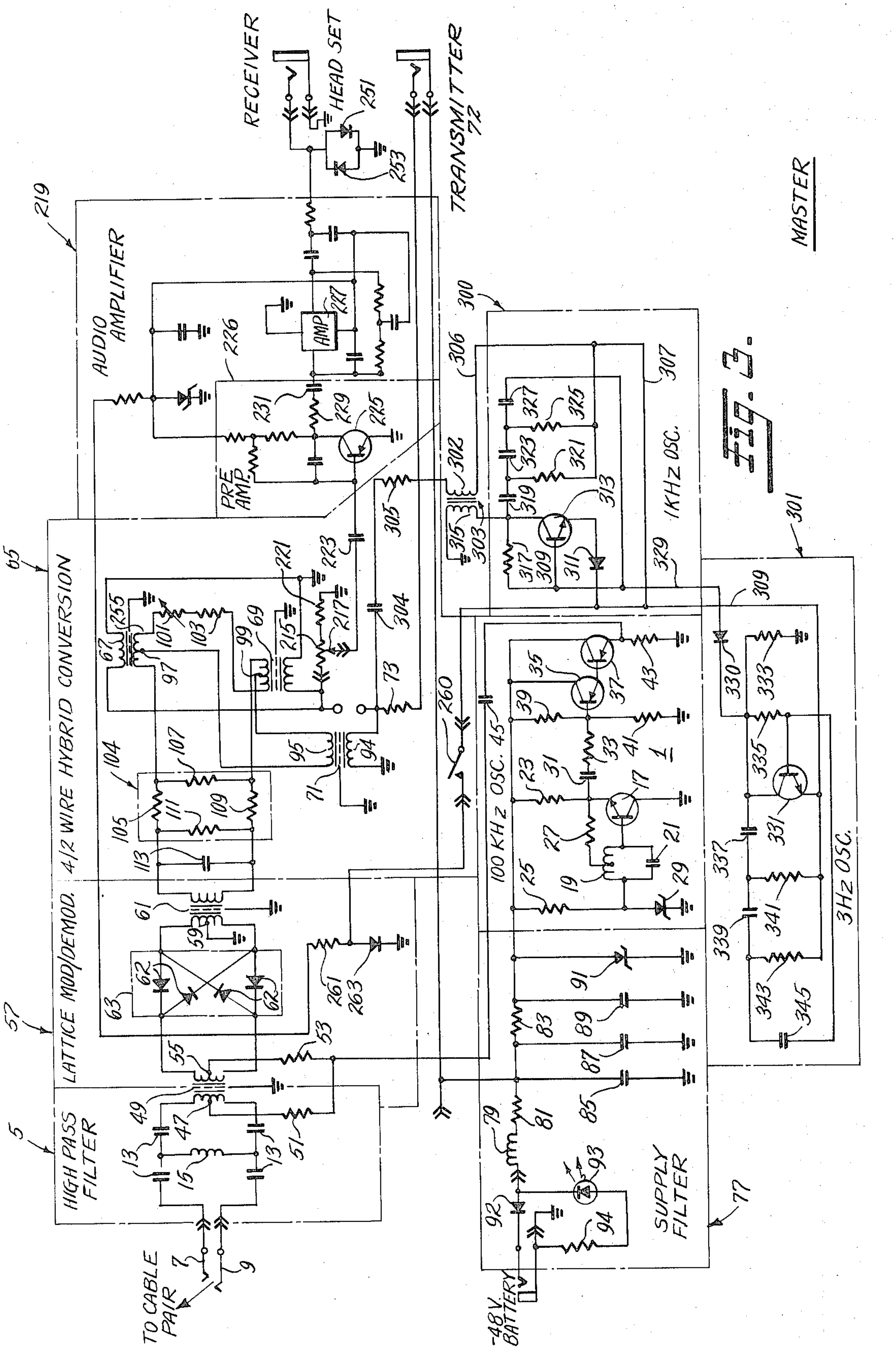
FIG. 3 is a detailed schematic diagram of the Master circuit of FIG. 1.
Figure 4:
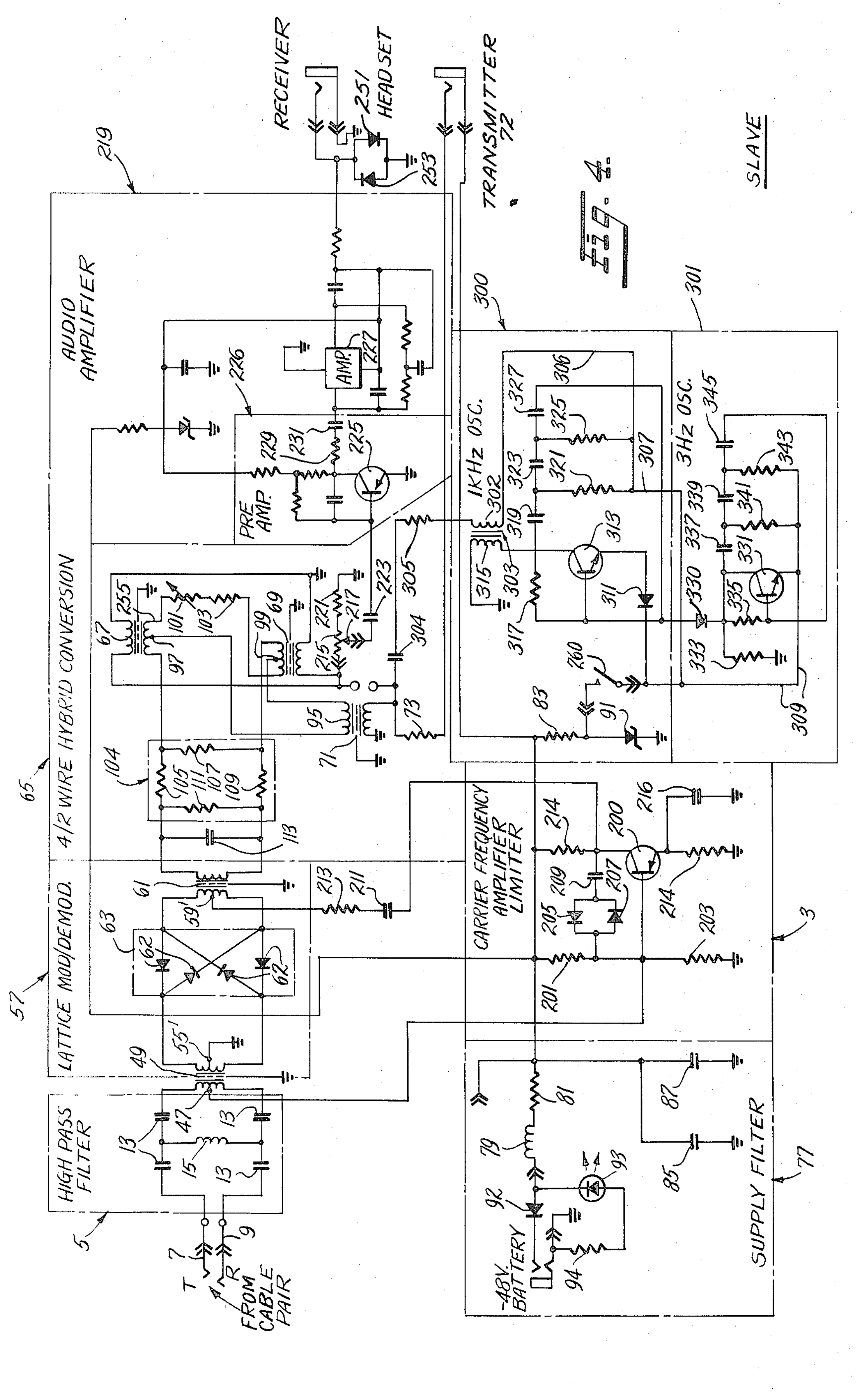
FIG. 4 is a detailed schematic diagram of the Slave circuit of FIG. 2.

The intercom system according to the instant invention includes a Master Unit illustrated in FIGS. 1 and 3 and a Slave Unit illustrated in FIGS. 2 and 4. As will be seen from the discussion below each unit includes substantially identical circuitry, except that the Master Unit has a 100 KHz oscillator 1 while the Slave Unit has a carrier frequency amplitude limiter 3 and depends upon the Master Unit to generate its frequency.

Master Unit

With specific reference to the Master Unit in FIGS. 1 and 3 a High Pass Filter 5 includes a pair of input/output terminals 7 and 9 connectable to a cable pair. The filter is of conventional design and includes a plurality of capacitors 13 and an inductor 15. The High Pass Filter across the input/output line will allow only carrier frequencies to pass through and will block frequencies in the audio range, thus maintaining the confidentiality of the call in progress.

The 100KHz LC Oscillator 1 basically consists of a transistor 17, an inductor 19 and a capacitor 21. A positive feedback loop to the base of transistor 17 causes a carrier frequency to be developed between the emitter of transistor 17 and a ground point. A plurality of resistors 23, 25 and 27, together with a zener diode 29 provide the proper bias for transistor 17. The signal from the emitter of transistor 17 is coupled through a capacitor 31 and a resistor 33 to the base of a Darlington emitter-follower amplifier consisting of a pair of transistors 35 and 37. A pair of resistors 39 and 41 provide the bias for the amplifier. The signal appearing across a resistor 43 connects the emitter of transistor 37 to ground. This particular configuration of the emitter-follower provides a low impedance output source of the carrier frequency. The carrier frequency is applied from the emitter of transistor 37 through a capacitor 45 and a resistor 51 to a center tap 47 of a transformer 49. The frequency is therefore sent simplex across the balanced line to ground and to the Slave Unit which will amplify and limit it. (This will be discussed below in relation to FIG. 4 wherein the signal will provide the carrier frequency for the Slave Unit). The carrier frequency is also coupled through a resistor 53 to a center tap 55 on the secondary winding of transformer 49.

The transformer 49 connects the High Pass Filter 5 to a Lattice Modulator/Demodulator circuit 57 operating in both directions. As a modulator, the carrier signal voltage is applied between tap 55 of transformer 49 and a ground point connected to a center tap 59 of a second transformer 61. During each half cycle, a plurality of balanced diodes 62 in a bridge 63 of the Lattice Network act as a reversing switch operating at the carrier frequency.

The voice frequencies are transferred to the modulator via a 4/2 Wire Hybrid conversion circuit 65 consisting of a plurality of transformers 67, 69, and 71. The audio circuitry consists of a carbon transmitter 72, the transformer 71 and a current limiting resistor 73 connected to the "TALK" input on the headset.

All of the various circuit elements are in series with a −48 volt C.O. supply which has been filtered by a Supply Filter circuit 77 to prevent any unwanted noise from appearing in the system. The Supply Filter circuit 77 includes an inductor 79, a pair of series resistors 81 and 83, a plurality of parallel capacitors 85, 87 and 89 and a parallel zener diode 91. A diode 92 is positioned in series with the inductor 79 to prevent a reverse polarity connection to the unit. A light emitting diode 93 and a current reducing resistor 94 are positioned across the battery input terminals to indicate battery polarity.

When a voice is spoken into the transmitter 72, a signal is developed across a primary coil 94 of transformer 71. The signal is inductively coupled to a secondary winding 95 which is in turn applied to a center tap 97 and a center tap 99 of transformers 67 and 69 respectively. This signal is thus divided equally between a balancing circuit composed of a variable resistor 101 and a fixed resistor 103 and the lattice network 57 via the transformer 61 and a 3 db matching pad 104 composed of a plurality of resistors 105, 107, 109, and 111. The 3 db pad is used for better balancing of the signal. The use of the hybrid configuration of circuit 64 is to secure transmission in both directions and the conversion of a four-wire circuit (two to transmit and two to receive) to a two-wire circuit with a minimum amount of loss to the line and the maximum amount of return loss for the sidetone feedback to the receiver.

A capacitor 113 across transformer 61 prevents most of the carrier frequency from appearing in the hybrid circuit.

When an audio signal is applied to transformer 61, it is inductively coupled to the secondary winding of the transformer. The carrier frequency switches the diodes in bridge 63 "on" and "off" to allow the voice signal to modulate the carrier frequency. The carrier is suppressed leaving only the sideband present at the output or line.

Slave Unit

Before discussion is completed on the Master Unit, reference is now made to the Slave Unit illustrated in FIGS. 2 and 4. It will be noted that those components which are identical to the components in the Master Unit have identical numbers.

The transformer 49 of the Slave Unit receives the carrier simplex across the line, and it is present on center tap 55' leading to ground. A transistor 200 is utilized as an amplifier and limiter in the Carrier Frequency Amplifier Limiter circuit 3. Thus, the unit will always provide the same magnitude and exact frequency of the master message terminal. A pair of resistors 201 and 203 provide the bias for transistor 200. A pair of diodes 205 and 207, together with a capacitor 209 compose the feedback circuit for limiting the signal amplitude coupled to the modulator or through a capacitor 211 and a resistor 213. This line is connected to center tap 59' of transformer 61. A pair of biasing resistors 214 are connected to the emitter and collector of transistor 200 while the emitter is also coupled to ground through a capacitor 216.

The modulator operates in the same manner as in the Master Unit explained above. The demodulation takes place in the Modulator/Demodulator in the following manner: As discussed above, upon sending of the carrier frequency simplex to ground from the Master Unit via tap 59, the slave message terminal will always be operating at the same exact frequency. Therefore, both message terminals will be in synchronziation at all times despite any slight variation of the single carrier frequency generated by the Master Unit. This being the case, the switching of the balanced diode bridge 63 of each message terminal is at the same rate at any instant in time. This allows the signal received across the line to be demodulated at the same rate that the signal is modulated and to be applied to the hybrid circuit 63 for amplification through transformers 67 and 69 which have aiding fields for minimum loss of receiving signal.

The receiving signal is developed across a potientiometer or volume control 215 having a wiper 217 for selecting any desirable signal level to an audio amplifier 219. A resistor 221 is in series with the potentiometer 215 and is connected to ground in order to eliminate the possibility of completely shutting off the receiver.

The signal picked up on wiper 217 is coupled through a capacitor 223 to the base of a transistor 225 in a preamplifier stage 226 and is then coupled to an amplifier 227 which is an integrated one-quarter watt power output amplifier. The coupling is accomplished through a resistor 229 and a capacitor 231. (Amplifier and preamp construction and operation are of a well known standard configuration, and it is not necessary to discuss them here).

Before the signal is delivered to the "RECEIVER" portion of the HEADSET, the signal is limited in amplitude by a pair of diodes 251 and 253.

The tone used for tracing and verification by either message terminal is applied to coil 95 on transformer 71 in the same manner as the voice signals. The tone circuit consists of a pair of oscillators 300 and 301. Oscillator 300 oscillates at 1000 Hz and is interrupted by the other oscillator 301 oscillating at a rate of 3 Hz. These oscillators are controlled by a "tone" toggle switch 260 which energizes the circuit when the switch is activated.

In the Master Unit the toggle switch 260 is connected to the amplifier 219 via a resistor 261 and to ground via a diode 263.

The 1 KHz oscillator 300 is an audio oscillator of the phase shift type. Negative voltage is supplied through a winding 302 of a transformer 303 from a coupling capacitor 304 and a resistor 305 via a plurality of lines 306, 307 and 309 through a diode 311 to the emitter of a transistor 313. Positive voltage is supplied from ground through a winding 315 of transformer 303 to the collector of transistor 313. The transistor is turned on with a positive voltage to its base through a resistor 317. An AC signal is thus developed across transistor 313 and is applied to a capacitor 319. The other side of the capacitor 319 is connected to a resistor 321 and a capacitor 323. The opposite side of capacitor 323 is in turn connected to a resistor 325 and a capacitor 327. The resistors are in turn connected to lines 306 and 307, while capacitor 327 is connected to a line 329. The specific operation of oscillator 300 is discussed in U.S. Pat. No. 3,627,933.

The 3 Hz oscillator 301, connected to audio oscillator 300 via a line 329 and a diode 330, is an interrupter oscillator also of the phase shift type. Negative voltage is applied through lines 306, 307, and 309 to the emitter of a transistor 331. Positive voltage is supplied from ground through a resistor 333 to the collector of transistor 331 which is thereby turned on with positive voltage to its base from resistor 333 and a resistor 335. An AC signal is developed across the transistor 331 and a portion of this signal is applied to a capacitor 337. Capacitor 337 is connected to a capacitor 339 and a resistor 341. Another resistor 343 is connected to capacitor 339 and is in parallel across resistor 341. Connected to the base of transistor 331 is a capacitor 345. The audio oscillator 300 is controlled by the interrupter oscillator 301 in a manner discussed in U.S. Pat. No. 3,627,933.

Operation

The operation of the specific components of the device have been discussed above, and the following is a brief description of the overall operation.

The Master Unit generates the carrier frequency by means of 100 KHz oscillator 1 through capacitor 45 to tap 47 in transformer 49 and sends simplex across the balanced line to ground to the Slave Unit Amplifier and Limiter 3. This will provide the carrier frequency for the Slave Unit. The carrier frequency is also coupled to the center tap 55 on transformer 49 which is part of the Modulator/Demodulator 57. Voice frequencies are transferred to the circuit 57 acting as a modulator via 4/2 wire hybrid conversion circuit 65 when voice is spoken into the "TALK" portion of the headset (transmitter 72), thus developing a signal across the primary 94 of transformer 71. The audio signal is applied through transformers 67 and 69 to transformer 61 and is inductively coupled to the secondary winding thereof, while the carrier frequency switches the diodes 62 "on" and "off" to allow the voice signal to modulate the carrier frequency. The carrier is suppressed leaving only the sidebands present at terminals 7 and 9.

At the slave unit the carrier frequency is received simplex and appears at transformer 49. Transistor 200 and associated elements of circuit 3, acting as an amplifier and limiter, provides the same instantaneous carrier frequency for the slave unit as is generated by the master. Demodulation takes place in circuit 57. Since the slave and master are always operating at the same exact frequency, the switching of diodes in bridge 63 of each message terminal is at the same rate at any instant in time. Thus, the signal received across the line is demodulated in the slave at the same rate that the signal is modulated in the master. It is then applied to the hybrid circuit 65 for amplification. The volume of the signal is adjusted at 215 and fed into pre-amp 226 and amplifier 219, and hence to the headset.

While the basic embodiments of the invention have been described, it will be understood that it is capable of many further modifications and this application is intended to cover any variations, uses or adaptions of the invention following in general, the principles of the invention and including such departures from the present disclosure as come within knowledge or customary practice in the art to which the invention pertains, and as may be applied to the essential features hereinbefore set forth and fall within the scope of the invention or the limits of the appended claims.

We claim:

1. A telephone communication device including a pair of communication units connected together during use by a line including a pair of wires comprising:
a. means in only one unit for generating a frequency carrier, and means for inserting said carrier frequency in series with the line at said one unit,
b. double balanced means for modulating and demodulating the carrier frequency in each of said units,
c. means in only the other of said units for amplifying and limiting the carrier frequency, and means for applying the output of said amplifying and limiting means to the modulating and demodulating means in said other unit.

2. A telephone communication device as defined in claim 1 including means connected between the output of the modulating and demodulating means and the line in each of said units for blocking frequencies in the audible range.

3. A telephone communication device as defined in claim 1 wherein said modulating/demodulating means is operable in two directions.

4. A telephone communication device as defined in claim 1 including means for transferring voice frequencies to said modulating and demodulating means for securing transmission in two directions whereby a two-wire channel is converted to four-wire receiving means.

5. A telephone communication device as defined in claim 1 wherein said amplifying and limiting means provides a signal in the other of said units of the same magnitude and frequency as the signal generated in said one unit.

6. A telephone communication device as defined in claim 1 wherein said modulating/demodulating means in the other of said units demodulates a single carrier frequency simplex generated by said one unit.

7. A telephone communication device as defined in claim 4 including means connected to the input of said voice transferring means for tracing and verifying the continuity of the pair of wires.

8. A telephone communication device as defined in claim 7 wherein said tracing and verifying means comprises a tone circuit having a first oscillator interrupted by a second oscillator.

9. A telephone communication device as defined in claim 1 wherein said carrier frequency is in the order of 100 KHz.

10. A telephone communication device including a pair of communication units connected together during use by a line including a pair of wires comprising:
a. a master unit and a slave unit including in serial connection:
1. a pair of input/output terminals,
2. a high pass filter connected to said terminals,
3. a lattice modulator/demondulator connected to said filter,
4. an impedance matching pad connected to said modulator/demondulator,
5. a 4/2 wire hybrid conversion circuit connected to said pad,
6. an amplifying means connected to said conversion circuit,
7. an audible receiver means connected to said amplifying means,
b. a tone generator means including a pair of oscillators connected to an input of said conversion circuit,
c. said master unit including a carrier frequency oscillator connected to said modulator/demodulator, and
d. said slave unit including means for amplifying and limiting the carrier frequency received from said master unit over the pair of wires and applying the limited carrier frequency to the lattice modulator/demodulator in said slave unit.

11. A master unit for use in a telephone communication system comprising:
a. a pair of input/output terminals,
b. a high pass filter means connected to said terminals for blocking frequencies in the audible range,
c. means only in said unit for generating a frequency carrier, and means for inserting said carrier frequency in series with the input/output terminals,
d. a double balanced means for modulating and demodulating the carrier frequency connected to said filter,
e. an impedance matching pad connected to said modulator and demodulator means,
f. a 4/2 wire hybrid conversion circuit means connected to said pad,
g. an amplifying means connected to said conversion circuit,
h. an audible receiver means connected to said amplifying means, and
i. a tone generator means including a pair of oscillators connected to an input of said conversion circuit, the first of said oscillators being interrupted by the second of said oscillators.

12. A slave unit for use in a telephone communication system comprising:
a. a pair of input/output terminals,
b. a high pass filter means connected to said terminals for blocking frequencies in the audible range,
c. means only in said unit for amplifying and limiting a carrier frequency received through said input/output terminals and applying the limited carrier frequency to a double balanced means for modulating and demodulating the carrier frequency,
d. said modulating and demodulating means being connected to said filter,
e. an impedance matching pad connected to said modulator and demodulator means,
f. a 4/2 wire hybrid conversion circuit means connected to said pad,
g. an amplifying means connected to said conversion circuit,
h. an audible receiver means connected to said amplifying means, and
i. a tone generator means including a pair of oscillators connected to an input of said conversion circuit, the first of said oscillators being interrupted by the second of said oscillators.

* * * * *